Aug. 28, 1962  D. J. BORODIN  3,051,288
WORK LOADER
Filed June 3, 1957  3 Sheets-Sheet 1
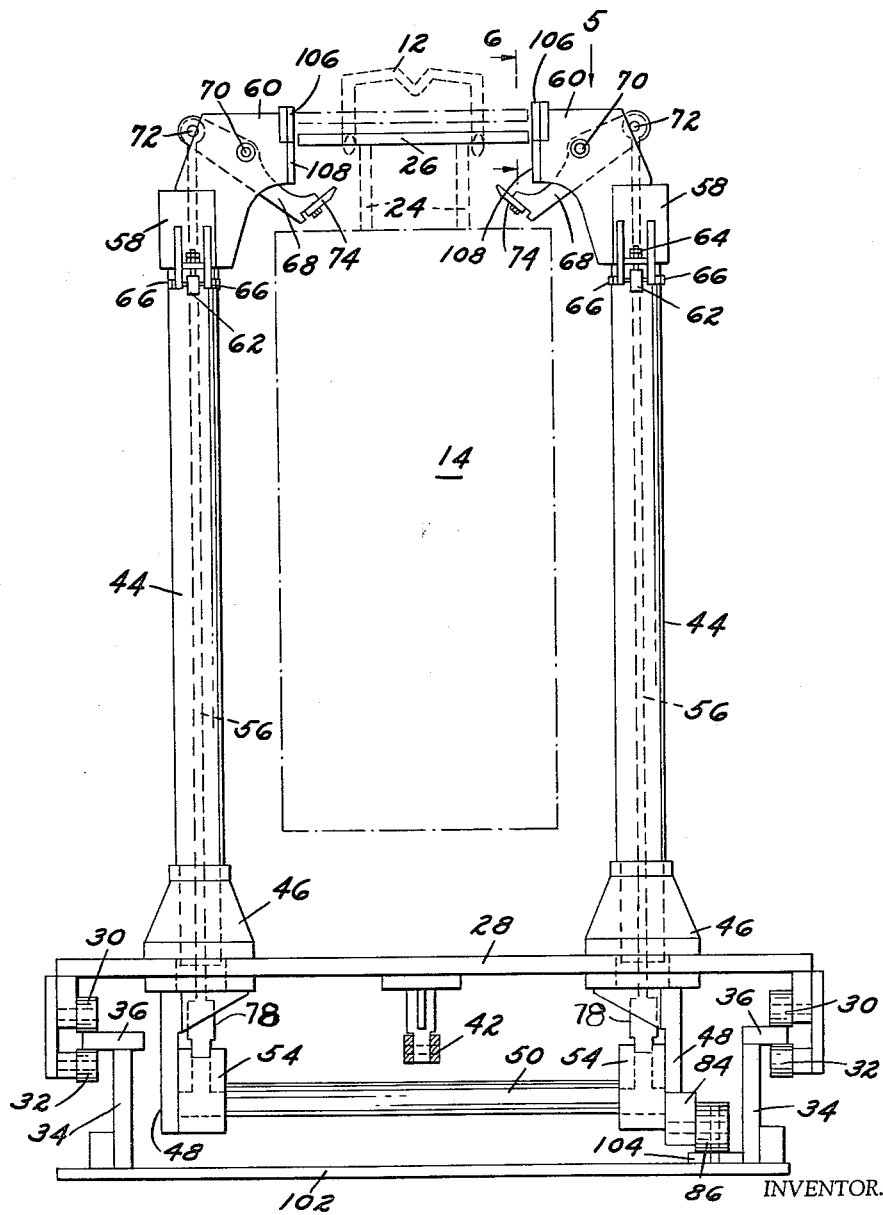
INVENTOR.
DANIEL J. BORODIN
BY
ATTORNEYS

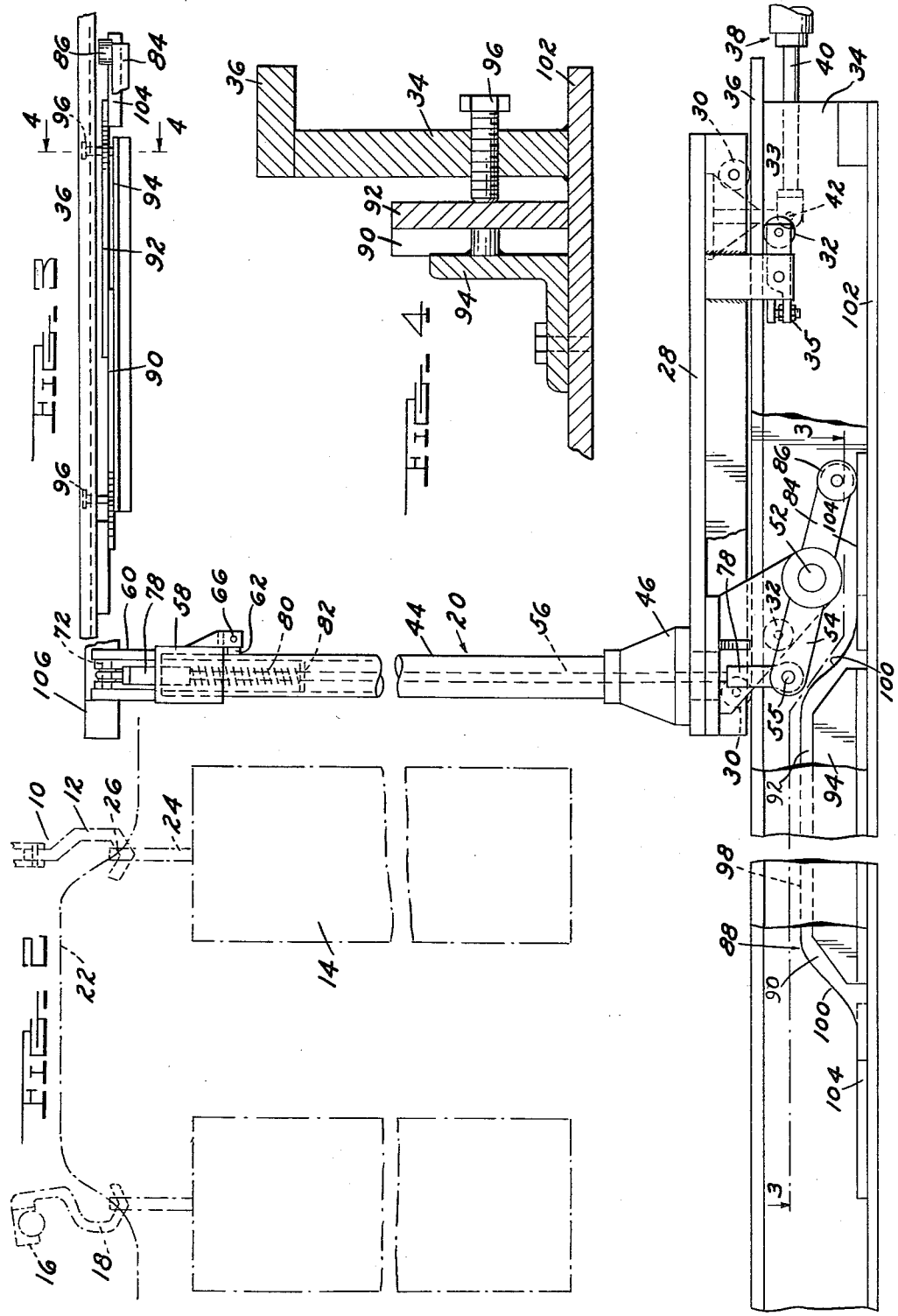

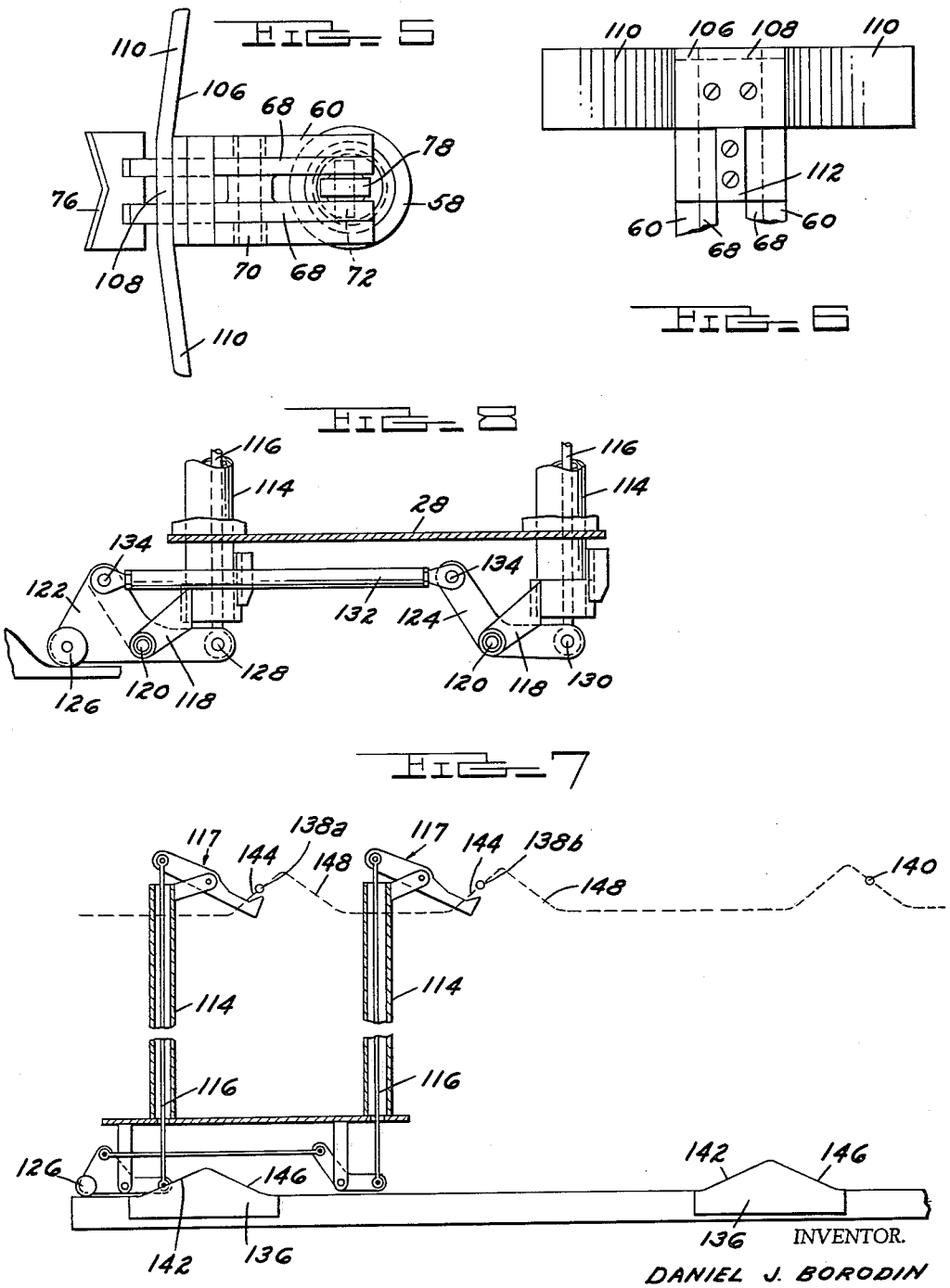

United States Patent Office 3,051,288
Patented Aug. 28, 1962

3,051,288
WORK LOADER
Daniel J. Borodin, Detroit, Mich., assignor to Wagner Brothers Incorporated, Detroit, Mich., a corporation of Michigan
Filed June 3, 1957, Ser. No. 663,132
2 Claims. (Cl. 198—20)

This invention relates to a work loader and more particularly to a carriage device for transferring work racks containing parts to be plated from a conveyor or work loading area to work rack carriers of an automatic plating machine at the work loading station thereof.

In the common automatic type plating machine wherein the work pieces are caused to travel progressively around an endless path through plating baths, rinse baths, etc., there is usually provided at a point in said endless path a loading and unloading station where racks supporting the work pieces are suspended on the carriers of the plating machine and are removed therefrom. In some plating machines, the racks are suspended on and removed from the carriers at the loading station manually. In other instances, the loaded racks are too heavy to be lifted manually and are therefore suspended on and removed from the carriers by some form of work loading mechanism. The work pieces are often "racked" at a point remote from the loading station of the plating machine. Quite often, a conveyor is arranged from the location where the work pieces are arranged on the racks to a point adjacent the loading station of the plating machine so that as the racks approach the loading station, they are removed from the conveyor and suspended from the carriers of the plating machine.

It is an object of the present invention to provide a loading mechanism adapted for removing work racks from a conveyor and suspending them on the carriers of the plating machine at the work loading station and to remove racks containing plated work pieces from said station of the plating machine and transport them to the conveyor.

The work loader of the present invention is characterized by its relatively simple construction, by its smooth operation without producing unnecessary jarring of the work pieces and by its ability to operate within a relatively confined space.

In the drawings:

FIG. 1 is an end elevational view of a work loader constructed in accordance with the present invention.

FIG. 2 is a side elevational view thereof with parts broken away.

FIG. 3 is a sectional view along the line 3—3 in FIG. 2 and showing a portion of the cam construction for actuating the lifting members of the work loader.

FIG. 4 is a sectional view along the line 4—4 in FIG. 3.

FIG. 5 is a fragmentary view of the upper end of one of the work lifting devices of the loader as seen in the direction of the arrow 5 in FIG. 1.

FIG. 6 is a fragmentary sectional view along the line 6—6 in FIG. 1.

FIG. 7 is a semi-diagrammatic view of another embodiment of a loader of the present invention.

FIG. 8 is a fragmentary view showing a portion of the loader illustrated in FIG. 7.

Referring now to FIG. 2, there is illustrated a work loader of the present invention that is designed for transferring work pieces from a conveyor to a plating machine. A portion of the conveyor is shown at 10 with depending hooks 12 from which a work rack 14 is suspended. The plating machine, not shown, is provided with carriers 16 having hook members 18. The work loader of the present invention generally designated 20 is designed to engage a work rack on the conveyor, lift it off of hook 12, transfer it along the path designated by the broken line 22 and deposit it on the hook 18 of the carrier 16.

Referring to FIG. 1, it will be observed that rack 14 at its upper end is provided with a pair of uprights 24 which are transversed by a cross bar 26. Hooks 12 and 18 are arranged to engage cross bar 26 to support the rack.

The work loader 20 comprises a carriage having a supporting platform 28 which is guided by rollers 30 and 32 at each side thereof on tracks 34. Tracks 34 include flanges 36, the rollers 30, 32 enaging the top and bottom faces of flanges 36. If desired, lower rollers 32 may be mounted on pivoted arms 33, the position of which may be varied by adjusting screws 35. Tracks 34 extend between the conveyor 10 and the loading station of the plating machine wherein the carriers 16 are located. Movement of the conveyor 10 and the carriers 16 on the plating machine are correlated, each being periodically indexed to bring one of the conveyor hooks 12 and one of the carrier hooks 18 into alignment with the work loader. Any suitable means may be employed for reciprocating the loader 20 along tracks 34 between the conveyor and the loading station of the plating machine. In the embodiment disclosed, these means are in the form of a piston-cylinder assembly 38 with the end of the piston rod 40 connected to the underside of platform 28 as at 42.

At the forward end thereof, platform 28 is provided with a pair of columns 44 in the form of upright tubes that are mounted on platform 28 by base members 46. On its underside, platform 28 has fixed thereto below columns 44 a pair of brackets 48 on which a torque tube 50 is journalled as at 52. A pair of levers 54 are fixed one adjacent each of the opposite ends of torque tube 50. To the free end of each lever 54 there is connected as at 55 a link 56. Link 56 extends upwardly through column 44. On the upper end of each column 44, there is mounted a head 58 formed with a pair of integral bracket portions 60. A lug 62 is utilized for locating each head 58 in its proper position at the upper end of columns 44. The vertical position of head 58 is adjusted by means of a set screw 64 and the angular position of each head 58 in a horizontal plane is adjusted by opposed set screws 66. Between each pair of bracket portions 60, there is pivoted a pair of levers 68 as at 70. The upper end of each link 56 is connected to its respective pair of levers 68 as at 72. The pivots at 55 and 72 are preferably in the form of spherical rod end bearings. A lift plate 74 is mounted at the inner ends of each pair of levers 68. Lift plate 74 is fashioned with a V-shaped notch 76 along its upper edge (FIG. 5). Link 56 comprises a rigid rod with threaded fittings 78 at each end thereof. The threaded connection between fittings 78 and the rod enables the length of each link 56 to be adjusted. The links 56 are normally biased upwardly so that the levers 68 assume the downwardly inclined position shown in FIG. 1. The biasing means consist of compression springs 80 surrounding the upper ends of link 56 and acting at their lower ends against a stop 82 within columns 44 and at their upper ends against fittings 78.

At one end of torque tube 50, there is fixed a second lever 84 which supports a roller 86 forming a cam follower. Roller 86 is arranged to engage a cam track assembly 88 for raising and lowering lift plates 74 through link 56. The cam track assembly 88, as shown in FIGS. 2, 3 and 4, is located alongside one of the tracks 34. This assembly comprises a pair of upright cam plates 90, 92 clamped in overlapping relation against an angle 94 by means of clamping screws 96 extending through the adjacent track 34. Each cam plate 90, 92 is fashioned with a horizontally extending portion 98 and an inclined portion 100. The whole assembly is mounted on a base plate 102. Thin bearing plates 104 are mounted on base plate 102 at the opposite ends of cam assembly 88. Cam plates 90, 92, as is illustrated, are adjustable lengthwise of track 34 so that the inclined surfaces 100 thereof can be properly located with respect to the hook members 12 and 18, respectively. Cam plate 92 is arranged so that when the cam follower 86 rides up the incline 100 thereof, lift plates 74 describe the path of broken line 22 adjacent hook 12 so that the lift plates engage the cross bar 26 on hook 12 and lift it in the direction shown. Cam plate 90 is adjusted so that as the cam follower 86 rolls down the incline 100, lift plates 74 describe the path of line 22 adjacent the hook 18 to deposit the cross bar 26 of rack 14 onto hook 18.

Under some circumstances, it may be desired to have the lift plate 74 follow a rather sharply inclined line adjacent the hooks 12 and 18 so as to avoid interference with components of the conveyor or the plating machine. However, experience has shown that if the portions 100 of cam plates 90, 92 are too sharply inclined, the loader will not operate smoothly. If the portions 100 are inclined to the horizontal at an angle greater than 30° or 40°, a jarring movement of links 56 is produced and work pieces on the rack 14 are apt to be jarred loose. It is essential, therefore, that these portions 100 of cam plates 90, 92 have a gradual incline. Therefore, if it is essential that the path of the lift plates 74 be inclined at an angle of say 50° to 60° adjacent the hooks 12 and 18, this is accomplished by controlling the relative lengths of the lever arms provided by levers 68. Thus, as shown in FIG. 2, the effective lengths of levers 54 and 84 are substantially equal so that the extent of vertical movement of roller 86 in riding up the incline 100 is substantially equal to the extent of vertical shifting of link 56. However, it will be observed from FIG. 1 that the distance between pivot 70 and pivot 72 on levers 86 is smaller than the distance between pivot 70 and lift plates 74. Thus, levers 68 amplify the vertical shifting movement of links 56 so that lift plates 74 move through a steeper incline than the portions 100 of cam plates 90, 92.

The operation of the above described loading device is as follows: Assuming that the carrier 16 and the conveyor 10 are indexed to position the hook members 18 and 12 in the position shown and that hook 12 supports a rack 14 as illustrated and hook 18 is not occupied, it is the function of carriage 20 to lift rack 14 off of hook 12 and deposit it on hook 18. With the carriage 20 located in the retracted position illustrated on tracks 34, springs 80 bias links 56 so that rollers 86 engage the flat bearing plates 104. When the piston-cylinder assembly 38 is energized, carriage 20 starts moving to the left as viewed in FIG. 2. As the roller 86 starts up incline 100 of cam plate 92, the lift plates 74 swing upwardly to engage the end portions of cross bar 26 and lift the cross bar out of hook 12. The cross bar 26 with its suspended rack 14 is thus carried in an elevated position from the conveyor 10 toward the carrier 16 of the plating machine. When the lift plates 74 approach hook 18, cam roller 86 is arranged to start down the inclined portion 100 of cam plate 90. As the roller 86 rolls down the inclined portion 100 of cam plate 90, links 56 are shifted upwardly to swing lift plates 74 downwardly and thereby deposit the cross bar 26 on hook 18. The work rack 14 is thus automatically transferred from the hook 12 of conveyor 10 onto hook 18 of carrier 16. The plating machine is then indexed so that a hook 18 supporting a rack filled with plated work pieces occupies the position shown for hook 18. Piston-cylinder assembly 38 is then actuated to retract carriage 20 and the loaded rack 14 is transferred from the hook 18 of carrier 16 to the empty hook 12 of conveyor 10 in substantially the same manner as described.

In view of the fact that the lift plates 74 in swinging from the raised to the lowered position slide axially of the cross bar 26, it has been found desirable to mount on the bracket portions 60 of heads 58 guide plates 106. Guide plates 106 are formed with a central straight portion 108 and outwardly flaring end portions 110. The central straight portions 108 are spaced apart a distance corresponding substantially to the length of cross bars 26 on the racks. Thus, if the cross bar 26 of the rack should tend to shift axially, it will be guided to a central position by the guide plates 106. Beneath each guide plate 106, there is arranged a narrow guide block 112. Guide block 112 retains the cross bar 26 in the centrally located position as the levers 68 swing downwardly to deposit the cross bar 26 on the hooks 12 and 18.

Some plating machines are constructed so as to accommodate two work racks side by side. Such plating machines are sometimes referred to as double-row machines. Loaders for use with such machines must be capable of simultaneously loading and unloading two racks positioned side by side. In FIG. 7, I have shown in a somewhat diagrammatic way a loader for use with such double-row machines. The loader illustrated in FIG. 7 is generally the same as the previous embodiment described with the exception, however, that instead of two columns 44, the carriage is provided with four columns 114 arranged as two pairs spaced lengthwise apart a distance corresponding to the spacing between the side-by-side work carriers in the plating machine. Within each column 114, there is arranged a link 116 similar in all respects to the links 56. At the upper end of each column, lifting devices generally designated 117 are provided which are substantially the same as those previously described. However, at the lower end of each column 114 below platform 28, there is fixed a bracket 118. Torque tubes 120 are journalled on brackets 118 in a manner similar to the torque tube 50. The torque tube 120 at one end of carriage 28 has fixed at one end thereof a lever 122. The other end of this torque tube and the opposite ends of the other torque tube have fixed thereon levers 124. Lever 122 supports a cam follower 126 and pivotally connects with the lower end of link 116 as at 128. Levers 124 connect with the lower ends of the other links 116 as at 130. A tie bar 132 interconnects levers 122 and 124 at one side of the carriage and the levers 124 at the other side of the carriage as at the pivotal connections 134. In this arrangement, the carriage is designed to travel along tracks similar to those shown at 34 in the previous embodiment described. However, in the modified arrangement, two individual cam plates 136 are spaced longitudinally of the track.

In the showing in FIG. 7, the upper portions of columns 114 have been rotated in a horizontal plane through 90° relative to the lower portions of these columns to better illustrate the operation of the modified form of work loader. In this arrangement, the cross bars of the two racks positioned side by side in the plating machine are designated at 138a and 138b. This fixed spacing corresponds to the distance between the lifting devices 117 at the front and rear end of the carriage. The location of one flight of the conveyor used with such a double-row machine is designated at 140. With this arrangement, when the cam follower 126 rides up the incline 142 of cam 136, the free ends of the lifting devices 117 describe the path designated by the broken line 144 so as to engage the cross bars at the points 138a and 138b. Then as the cam follower 126 rides down the incline 146 of cam 136, the ends of the lifting devices 117 describe the path indicated by the broken line 148. Thus, the cross bars of the racks are lifted off the hooks of the carriers at 138a and 138b and are then lowered so that the rack removed from the carrier hook at 138a will pass under the carrier hook at 138b. As the carriage moves toward the conveyor, the rack removed from the carrier hook at 138b will pass under the conveyor hook at 140. Then as the roller 126 rides up the incline 142 of the other cam 136, the racks previously picked up are elevated to the hooks on the conveyor; and as the cam follower rides down the incline 146, the lifting devices 117 deposit the racks on the conveyor hooks.

I claim:

1. Apparatus for transferring a work rack horizontally from one hooked supporting device to another comprising a track extending horizontally between said devices, a carriage mounted for movement on said track, means for reciprocating said carriage along said track, said carriage having a platform portion, a pair of levers pivotally supported on said carriage below said platform, one at each side thereof, means interconnecting said levers for movement in unison, a cam extending lengthwise of said track, a cam follower on said carriage adapted to engage said cam and in turn actuate said lever, said levers having their pivotal axes axially aligned and extending transversely of said track, a pair of upright supports on said platform, one at each side thereof, a pair of levers pivotally supported intermediate their ends at the upper ends of said upright supports, said last mentioned levers having their axes in generally the same horizontal plane, the pivotal axes of said upper levers extending parallel to said track, vertical links interconnecting the outer ends of said last mentioned levers with the first mentioned levers and lifting members carried by the inner ends of said levers at the upper ends of said upright supports, said cam having a rise portion which when engaged by said cam follower is adapted to shift the lifting members vertically from a lowered position to an elevated position.

2. The combination called for in claim 1 wherein the upper end of each column has mounted thereon a guide plate extending longitudinally of said track, said guide plate being located generally within the vertical path of travel of the lifting members at the inner ends of said upper levers.

References Cited in the file of this patent
UNITED STATES PATENTS

| | | |
|---|---|---|
| 1,464,589 | Talbot | Aug. 14, 1923 |
| 2,084,741 | Price | June 22, 1937 |
| 2,207,648 | Wick | July 9, 1940 |
| 2,611,493 | Nordquist | Sept. 23, 1952 |
| 2,806,577 | Lang | Sept. 17, 1957 |
| 2,807,349 | Hauk et al. | Sept. 24, 1957 |
| 2,929,487 | Lisowski | Mar. 22, 1960 |